US005953567A

United States Patent [19]

Muramatsu et al.

[11] Patent Number: 5,953,567

[45] Date of Patent: Sep. 14, 1999

[54] SCREW PUMP, TONER CONVEYING DEVICE USING THE SAME AND TONER FILLING SYSTEM

[75] Inventors: Satoshi Muramatsu; Takashi Hodoshima; Nobuo Kasahara, all of Kanagawa, Japan

[73] Assignee: Ricoh Company, Ltd., Tokyo, Japan

[21] Appl. No.: 09/112,351

[22] Filed: Jul. 9, 1998

[30] Foreign Application Priority Data

| | | | |
|---|---|---|---|
| Jul. 10, 1997 | [JP] | Japan | 9-185501 |
| Feb. 13, 1998 | [JP] | Japan | 10-031757 |

[51] Int. Cl.[6] .......................... G03G 15/08; B65G 53/08

[52] U.S. Cl. .......................... 399/256; 399/258; 399/260; 222/DIG. 1; 239/73; 406/55

[58] Field of Search .................................... 399/256, 254, 399/258, 260, 262, 27; 239/119, 73; 406/52, 53, 54, 55; 222/DIG. 1; 347/43, 86

[56] References Cited

U.S. PATENT DOCUMENTS

| | | | |
|---|---|---|---|
| 4,211,506 | 7/1980 | List et al. | 406/55 |
| 5,046,666 | 9/1991 | Ono | 239/119 |
| 5,329,340 | 7/1994 | Fukuchi et al. | 399/254 |
| 5,561,506 | 10/1996 | Kasahara | 399/256 |
| 5,638,159 | 6/1997 | Kai et al. | 399/253 |

FOREIGN PATENT DOCUMENTS

| | | |
|---|---|---|
| 10-49020 | 2/1998 | Japan . |

*Primary Examiner*—Arthur T. Grimley
*Assistant Examiner*—Hoan Tran
*Attorney, Agent, or Firm*—Oblon, Spivak, McClelland, Maier & Neustadt, P.C.

[57] ABSTRACT

A screw pump for use in an image forming apparatus for conveying toner has a female screw type stator formed with a double pitch spiral groove in its inner periphery, and a male screw type rotor rotatably received in the stator. Assuming that the rotor has a sectional diameter of RA, and that the stator has a minimum inside diameter of S.MIN, the rotor and stator bite into each other such that a dimensional ratio of RA/S.MIN satisfies a relation of RA/S.MIN≦1.04. A toner conveying device using such a screw pump and a toner filling system are also disclosed.

24 Claims, 12 Drawing Sheets

SCREW PUMP, TONER CONVEYING DEVICE USING THE SAME AND TONER FILLING SYSTEM

BACKGROUND OF THE INVENTION

The present invention relates to a device for conveying powder, particularly a screw pump advantageously applicable to toner used in an image forming apparatus, a toner conveying device using the screw pump, and a toner filling system.

Some different systems are available for the conveyance of powder and typified by the following systems. A first system includes a coil screw disposed in a piping connecting a powder supply source and a destination. A second system includes a power supply source and a destination arranged one above the other, so that power can be transferred mainly by gravity. A third system uses a screw pump which causes its rotor to rotate in order to move powder in the axial direction of the rotor, thereby feeding the powder from a powder supply source to a destination.

Generally, a copier, printer, facsimile apparatus or similar image forming apparatus uses any one of the above first to third conveying systems for conveying toner. However, a problem with the first system is that the coil screw cannot be surely rotated unless a straight or a gently curved toner transport path, as distinguished from a bent path, is available. Another problem is that an extremely heavy frictional load acts between the coil screw and the piping and increases the drive torque for the coil screw. This not only makes it difficult to convey collected toner over a long distance, but also causes stresses to act on the toner being conveyed and causes it to cohere or melt due to heat.

The second system implements relatively simple toner conveyance. However, collected toner storing means or a developing unit must be arranged substantially integrally with a cleaning unit. As a result, the application of the second system is limited to low speed machines or copiers and printers which are expected to produce only a small amount of copies or printings, due to limitations relating to mounting and a toner storing capacity.

The third system is capable of conveying toner stored or collected by, e.g., cleaning via a flexible piping or similar piping. Therefore, sure toner conveyance is achievable with a simple configuration without any limitation relating to a toner storing capacity or the location of a toner collecting section. Further, because the screw pump conveys toner in the form of a toner and air mixture, the toner can be stably conveyed while the toner being conveyed is free from undesirable stresses and prevented from cohering or melting.

In the third system advantageous over the first and second systems for the above reasons, the screw pump or so-called Mono pump is made up of a female screw type stator and a male screw type rotor rotatably received in the stator. The stator is formed with a double pitch spiral groove in its inner periphery.

The rotor of the screw pump is formed of rubber or similar elastic material. Therefore, while the rotor repeatedly rotates in sliding contact with the inner periphery of the stator, the inside diameter of the stator increases little by little. As the amount of bite between the stator and the rotor decreases due to the decrease in the inside diameter of the stator, air fed to the outlet side of the screw pump is apt to flow reversely toward the inlet side of the pump via the resulting gap between the stator and the rotor. Because the reverse flow of air effects the conveyance of powder, the screw pump is determined to have reached the end of its life and is replaced with a new screw pump. Of course, the screw pump with such a limited life is operable over only a relatively short period of time. To extend the life of the screw pump, the initial amount of bite between the stator and rotor may be increased such that an expected amount of bite is guaranteed over a long period of time despite the wear of the stator. This, however, brings about a problem that the toner is apt to cohere during conveyance.

SUMMARY OF THE INVENTION

It is therefore an object of the present invention to provide a screw pump achieving an extended service life without aggravating the cohesion of toner, a toner conveying device using the the same, and a toner filling system.

In accordance with the screw pump has a female screw type stator formed with a double pitch spiral groove in its inner periphery, and a male screw type rotor rotatably received in the stator. Assuming that the rotor has a sectional diameter of RA, and that the stator has a minimum inside diameter of S.MIN, the rotor and stator bite into each other such that a dimensional ratio of RA/S.MIN satisfies a relation of $RA/S.MIN \leqq 1.04$ and preferably a relation of $0.94 \leqq RA/S.MIN$ also.

Also, in accordance with the present invention, a screw pump has a female screw type stator formed with a double pitch spiral groove in its inner periphery, and a male screw type rotor rotatably received in the stator. Assuming that the rotor has an outside diameter of RB, and that the stator has a minimum inside diameter of S.MIN and a maximum inside diameter of S.MAX, the rotor and stator bite into each other such that a dimensional ratio of $RB \times 2/(S.MIN+S.MAX)$ satisfies a relation of $0.99 \leqq RB \times 2/(S.MIN+S.MAX)$ and preferably a relation of $RB \times 2/(S.MIN+S.MAX) \leqq 1.08$ also.

Further, in accordance with the present invention, a toner conveying device includes a screw pump comprising a female screw type stator formed with a double pitch spiral groove in its inner periphery, and a male screw type rotor rotatably received in the stator, for conveying powdery toner. An feeding device feeds air under pressure to the toner outlet of the screw pump when the screw pump is in operation. The rotor and stator bite into each other such that the dimensional ratio of RA/S.MIN satisfies a relation of $0.94 \leqq RA/S.MIN \leqq 1.04$.

Furthermore, in accordance with the present invention, a toner conveying device includes a screw pump comprising a female screw type stator formed with a double pitch spiral groove in its inner periphery, and a male screw type rotor rotatably received in the stator, for conveying powdery toner. An air feeding device feeds air under pressure to the toner outlet of the screw pump when the screw pump is in operation. The rotor and stator bite into each other such that a dimensional ratio of $RB \times 2/(S.MIN+S.MAX)$ satisfies a relation of $0.99 \leqq RB \times 2/(S.MIN+S.MAX) \leqq 1.08$.

Moreover, in accordance with the present invention, a system for filling toner in a toner storing section for replenishing toner to a developing unit included in an image forming apparatus includes a toner storing and feeding unit including toner storing means for storing toner to be filled in a filling portion included in the toner storing section, and toner feeding means including a toner conveying device for feeding the toner stored in the toner storing means. A connecting device is removably connected to the toner storing section. A flexible conveying member provides communication between the connecting device and the toner storing and feeding unit. The toner stored in the toner storing means is conveyed to the toner storing section by the toner conveying device.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1:
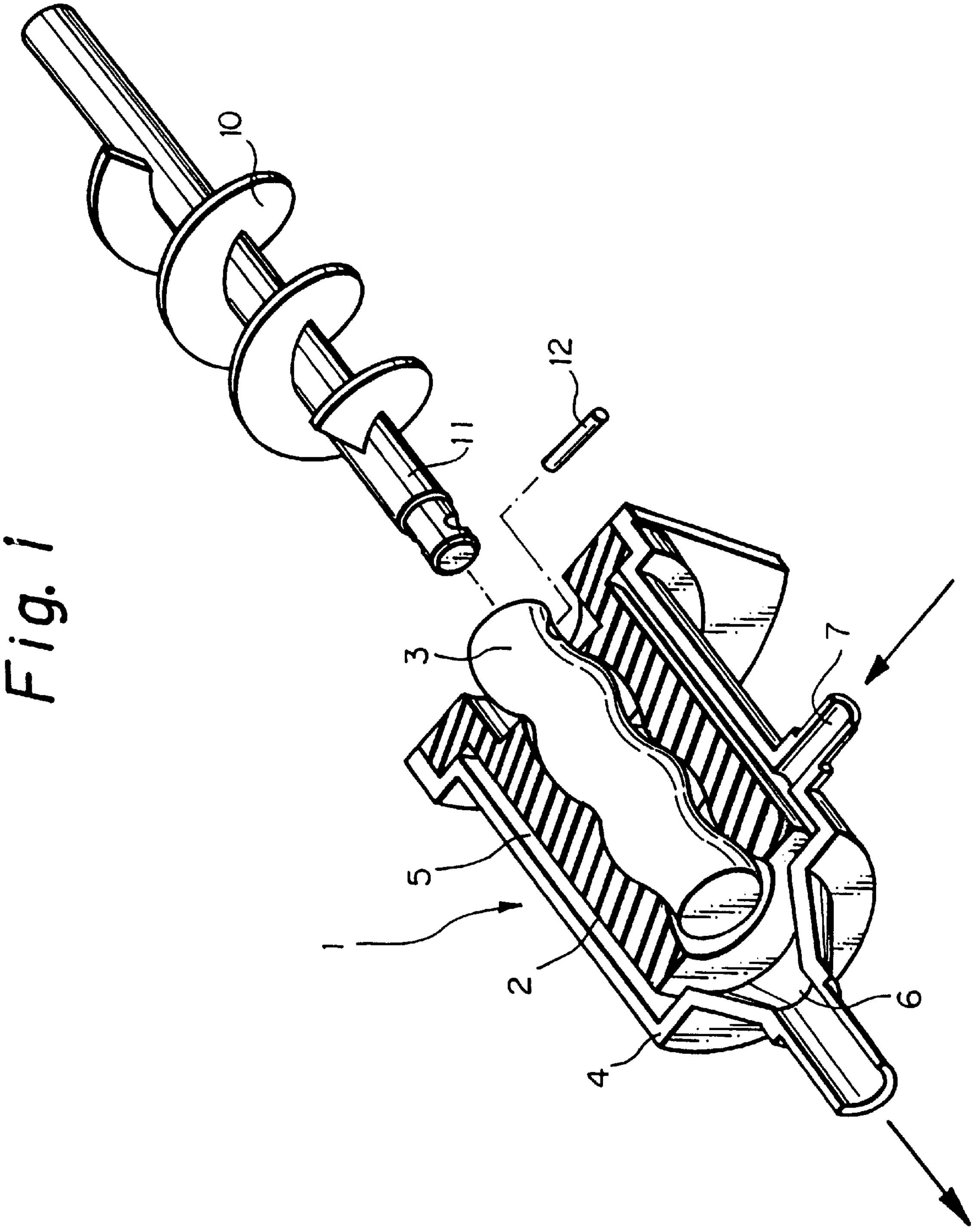
FIG. 1 is a partly sectional perspective view showing a screw pump embodying the present invention.

Referring to FIG. 1 of the drawings, a screw pump embodying the present invention is shown and generally designated by the reference numeral 1. As shown, the screw pump 1 is generally made up of a female screw type stator 2 formed of rubber or similar elastic material and a male screw type rotor 3 formed of, e.g., metal. The stator 2 is formed with a double pitch, spiral groove while the rotor 3 is rotatably received in the stator 2.

The rotor 3 is connected to a shaft 10 included in a conveyor screw 10 by, e.g., a spring pin 12 at the upstream side in the intended direction of toner conveyance. The rotor 3 is therefore rotated by the conveyor screw 10. A holder 4 is affixed to a side wall, not shown, and encloses the stator 2. The inner periphery of the holder 4 and the outer periphery of the stator 2 are spaced by a gap 5. The gap 5 is communicated to a toner outlet 6 located downstream of the rotor 3 in the above direction. An air inlet 7 is formed in the holder 4 and communicated to the gap 5. An air tube 14 (see FIG. 5) extending from an air pump or similar air supply source, not shown, is connected to the air inlet 7. Air under pressure is delivered from the air pump to the toner outlet 6 via the air inlet 7 and gap 5, so that toner is fluidized and surely and smoothly discharged in the direction indicated by an arrow.

The rotor 3 rotates in sliding contact with the stator 2 which is formed of rubber or similar elastic material. As a result, the inside diameter of the stator 2 increases little by little due to wear.

Figure 2:
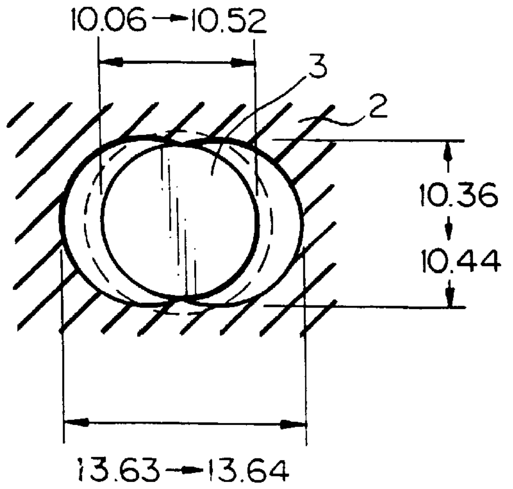
FIG. 2 is a view showing how the inside diameter of a stator included in the screw pump increases.

FIG. 2 shows the variation of the maximum inside diameter, the variation of the inside diameter and the variation of the minimum inside diameter of the stator 2 determined by a 190 hours test in which 10 hours of continuous operation was effected a day. As shown, the maximum inside diameter varied from 13.63 mm only to 13.64 mm, and the inside diameter slightly varied from 10.36 mm to 10.44 mm. However, the minimum inside diameter noticeably varied from 10.06 mm to 10.52 mm, reducing the amount of bite between the stator 2 and the rotor 3. Extended researches and experiments showed that the amount of bite between the stator 2 and the rotor 3 relates to the cohesion of toner, the blocking of toner at the toner outlet 6, noise ascribable to rubbing, and the reverse flow of air.

Figure 3A:
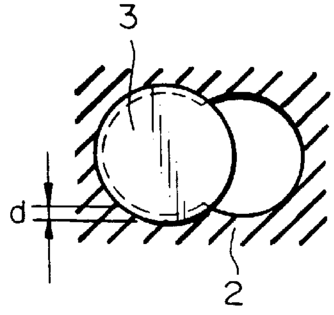
FIGS. 3A–3C each shows an amount of bite between the stator and a rotor also included in the screw pump at a particular position.
Figure 3B:
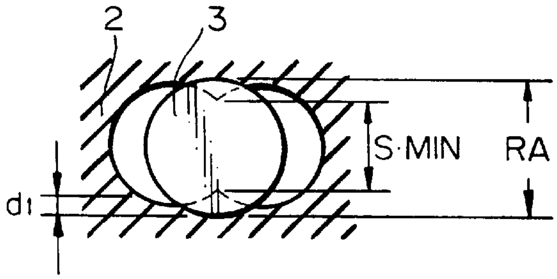
Figure 3C:
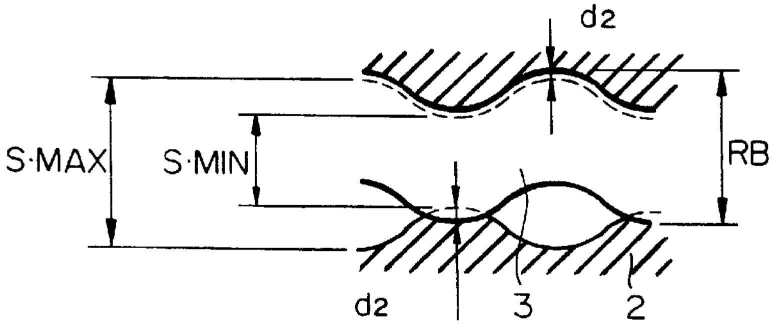

FIGS. 3A, 3B and 3C respectively show the mounts of bite d, d1 and d2 each being representative of a particular point of view. It was found by experiments that the amounts of bite d1 and d2 shown in FIGS. 3B and 3C, respectively, tend to influence the cohesion of toner and the reverse flow of air. As shown in FIG. 3B, the amount of bite d1 occurs between the sectional diameter of the rotor 3 and the minimum inside diameter of the stator 2. In this sense, the amount of bite d1 will be referred to as a sectional bite d1 hereinafter. As shown in FIG. 3C, the amount of bite d2 occurs between the spiral outside diameter of the rotor 3 and the inside diameter of the stator 2 and will be referred to as an outside diameter bite d2 hereinafter.

Experiments were conducted by varying the above sectional bite d1 and outside diameter bite d2 in order to determine the presence/absence of the reverse flow of air, the timings at which the cohesion of toner and the reverse flow of air occur, and so forth. The experiments showed that the sectional bite d1 has noticeable influence on the cohesion of toner and the reverse flow of air while the outside diameter bite d2 has noticeable influence on the reverse flow of air. We found a particular initial adequate range for each of the two different bites d1 and d2, taking account of the aging of the screw pump 1 also, as follows.

Assume that the rotor 3 has a sectional diameter RA and a spiral outside diameter RB, and that the stator 2 has a minimum inside diameter S.MIN and a maximum inside diameter S.MAX. Then, when a ratio RA/S.MIN relating to the sectional bite d1 was greater than 1.04, conveyed toner cohered. Therefore, the upper limit of the ratio RA/S.MIN should be smaller than 1.04 inclusive. On the other hand, when a ratio RB×2/(S.MIN+S.MAX) relating to the outside diameter bite d2 was smaller than 0.99, the reverse flow of air occurred in the screw pump 1. It follows that the lower limit of the ratio RB×2/(S.MIN+S.MAX) should be greater than 0.99 inclusive.

The dimensional ratio between the rotor 3 and the stator 2 and relating to the sectional bite d1 and the dimensional ratio between the same and relating to the outside diameter bite d2 share the same factor S.MIN which is the minimum inside diameter of the stator 2. Therefore, the lower limit of the dimensional ratio relating to the sectional bite d1 and that of the dimensional ratio relating to the outside diameter bite d2 are closely related to each other. This is also true with the upper limit of the dimensional ratio relating to the outside diameter bite d2 and that of the dimensional ration relating to the sectional bite d1.

For example, as to the dimensional ratio RA/S.MIN between the rotor 3 and the stator 2 and relating to the sectional bite d1, the upper limit of the ratio RA/S.MIN smaller than 1.04 inclusive causes toner to cohere little. On the other hand, the range of the lower limit is roughly restricted in order to maintain the ratio RB×2/(S.MIN+S.MAX) relating to the outside diameter bite d2 equal to or grater than 0.99. It was experimentally determined that the above lower limit of the ratio RA/S.MIN should be greater than 0.94 inclusive. Likewise, as to the dimensional ratio RB×2/(S.MIN+S.MAX) relating to the outside diameter bide d2, the range of the upper limit is roughly determined by the dimensional ratio relating to the sectional bite d1; RB×2/(S.MIN+S.MAX) should be smaller than 1.08 inclusive, as determined by experiments.

Thus, the screw pump 1 for conveying a developer or toner causes a minimum of toner to cohere and causes a minimum of air to flow reversely if the dimensional ratio RA/S.MIN between the rotor 3 and the stator 2 as to the sectional bite d1 is greater than 0.94 inclusive, but smaller than 1.04 inclusive, and if the dimensional ratio RB×2/(S.MIN+S.MAX) as to the outside diameter bite d2 is greater than 0.99 inclusive, but smaller than 1.08 inclusive.

Figure 4:
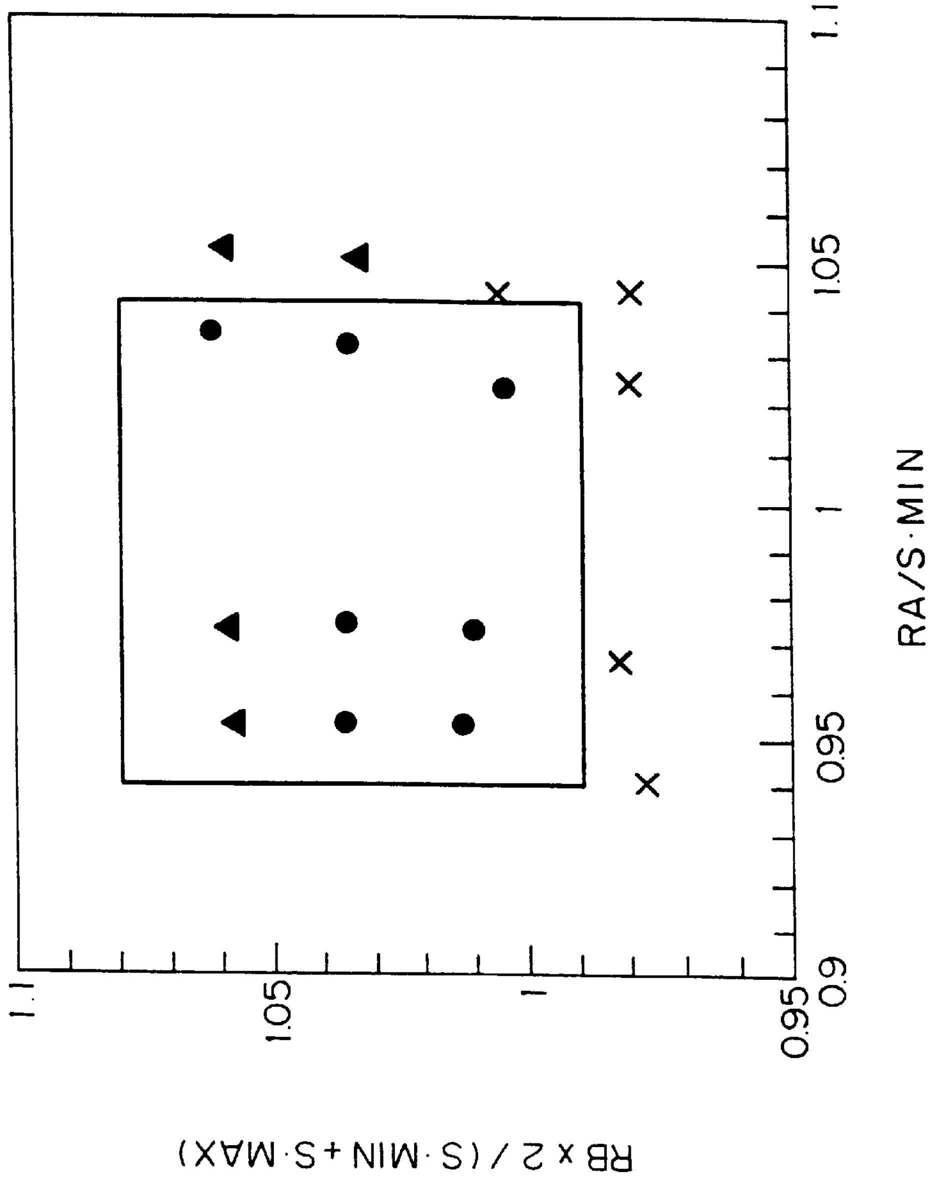
FIG. 4 is a graph showing an adequate range of dimensional ratios between the stator and the rotor as to a sectional bite and an outside diameter bite.

FIG. 4 is a graph in which the above adequate initial ranges are plotted in a frame. In FIG. 4, a circle is representative of a condition wherein toner conveyance was desirably effected without any reverse flow or air or the cohesion of toner. A triangle is representative of a condition wherein toner partly cohered although it was successfully conveyed. A cross is representative of a condition wherein some reverse flow of air occurred and effected toner conveyance although toner did not cohere. The results shown in FIG. 4 were determined when the rotor 3 was rotated at a speed of 200 rpm (revolutions per minute). Substantially the same results as those shown in FIG. 4 were attained when the rotation speed of the rotor 3 was higher than 200 rpm. However, when the rotation speed of the rotor 3 was lower than 200 rpm, the upper and right ranges of FIG. 4 in which dots change to triangles or crosses tended to decrease. That is, when the rotation speed was low, the upper limit of the ratio RA/S.MIN tended to fall.

The minimum inside diameter S.MIN of the stator 2 is the factor varying over the broadest range due to aging, as stated earlier. Therefore, in FIG. 4, the dimensional ratio sequentially shifts leftward downward. Although the minimum inside diameter S.MIN increases substantially in portion to the duration of operation up to a certain point, the increase approaches saturation on reaching the above point and is therefore not noticeable.

Considering the above tendency, the dimensional ratios RA/S.MIN and RB×2/(S.MIN+S.MAX) should preferably be set at the top right of the adequate initial range shown in FIG. 4, so that the screw pump 1 can have its service life extended.

The screw pump 1 is generally expected to operate at a rotation speed of 100 rpm to 200 rpm. When the rotation speed of the rotor 3 is low, it is preferable that the ratio RA/S.MIN be set at a small value within the above adequate range. This is because low rotation speeds of the rotor 3 would aggravate the cohesion of toner and would cause RA/S.MIN to contribute to the cohesion of toner, as stated previously. By contrast, when the rotation speed of the rotor 3 is low, the ratio RB×2/(S.MIN+S.MAX) may be selected in the direction in which the bite decreases. Specifically, if the rotation speed of the rotor 3 is low, then air flows reversely little, and toner is desirably conveyed. This allows the ratio RB×2/(S.MIN+S.MAX) to be set at a small value within the above adequate range.

The screw pump with the sectional bite d1 and outside diameter bite d2 each lying in the above desirable range can convey a developer, particularly toner, in a desirable manner.

Figure 5:
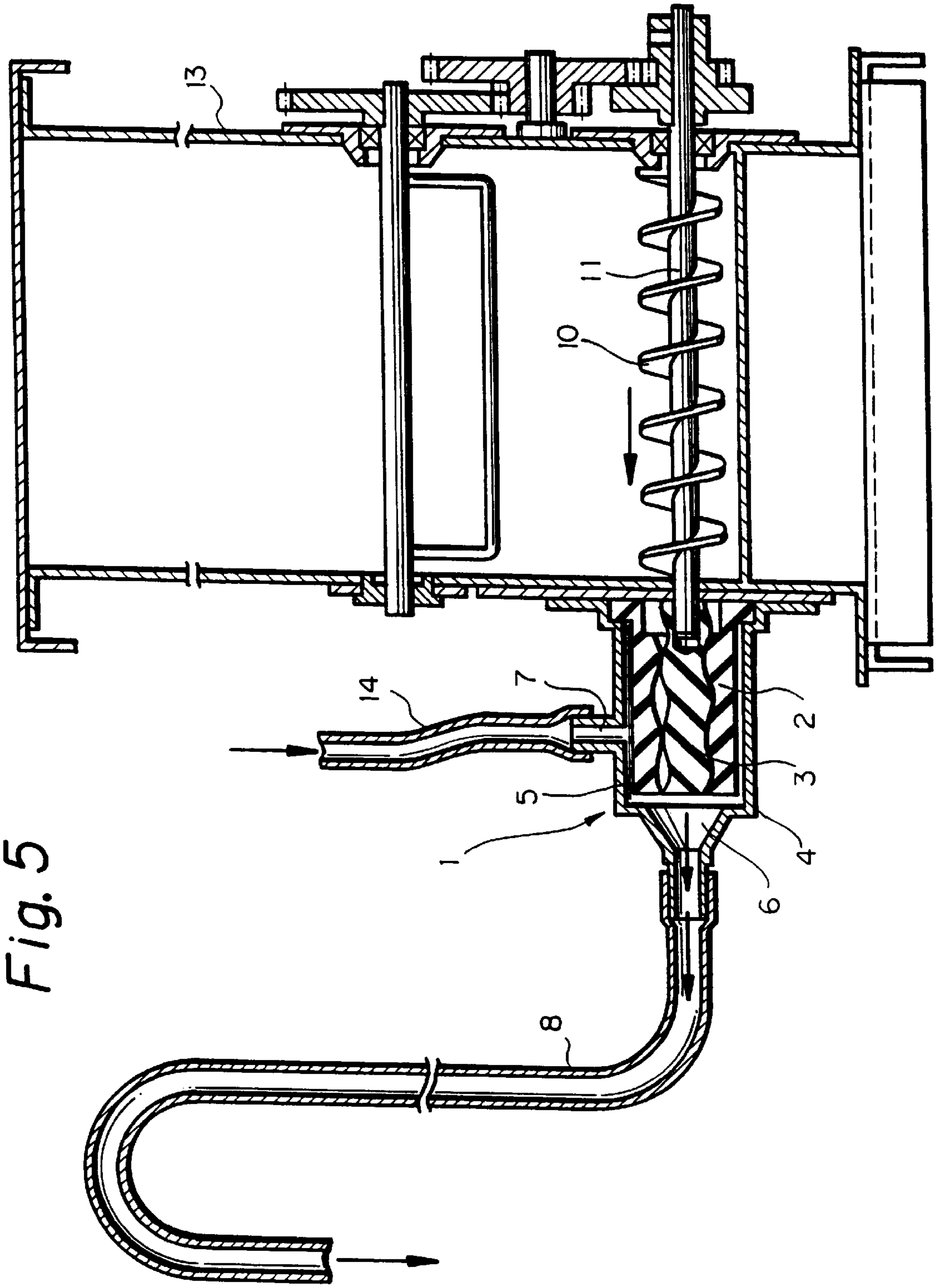
FIG. 5 is a section showing a specific configuration of a toner conveying device using the screw pump.

FIG. 5 shows a specific toner conveying device including the screw pump 1. The screw pump 1 to be described also has the configuration shown in FIG. 1; identical reference numerals denote identical structural elements. As shown, the toner conveying device conveys toner stored in a toner tank 13 to a developing unit not shown. The conveyor screw 10 is positioned in the vicinity of the bottom of the toner tank 13.

In response to a conveyance command, the device causes the conveyor screw 10 and rotor 3 to rotate and causes the air pump to operate. As a result, the toner is conveyed from the toner tank 13 to the developing unit. The device is disposed in an image forming apparatus or implemented as a unit located outside of the image forming apparatus. Because the sectional bite and outside diameter bite between the rotor 2 and the stator 3 each lies in a particular adequate range, the device allows a minimum of toner to cohere and achieves an extended service life.

Figure 6:
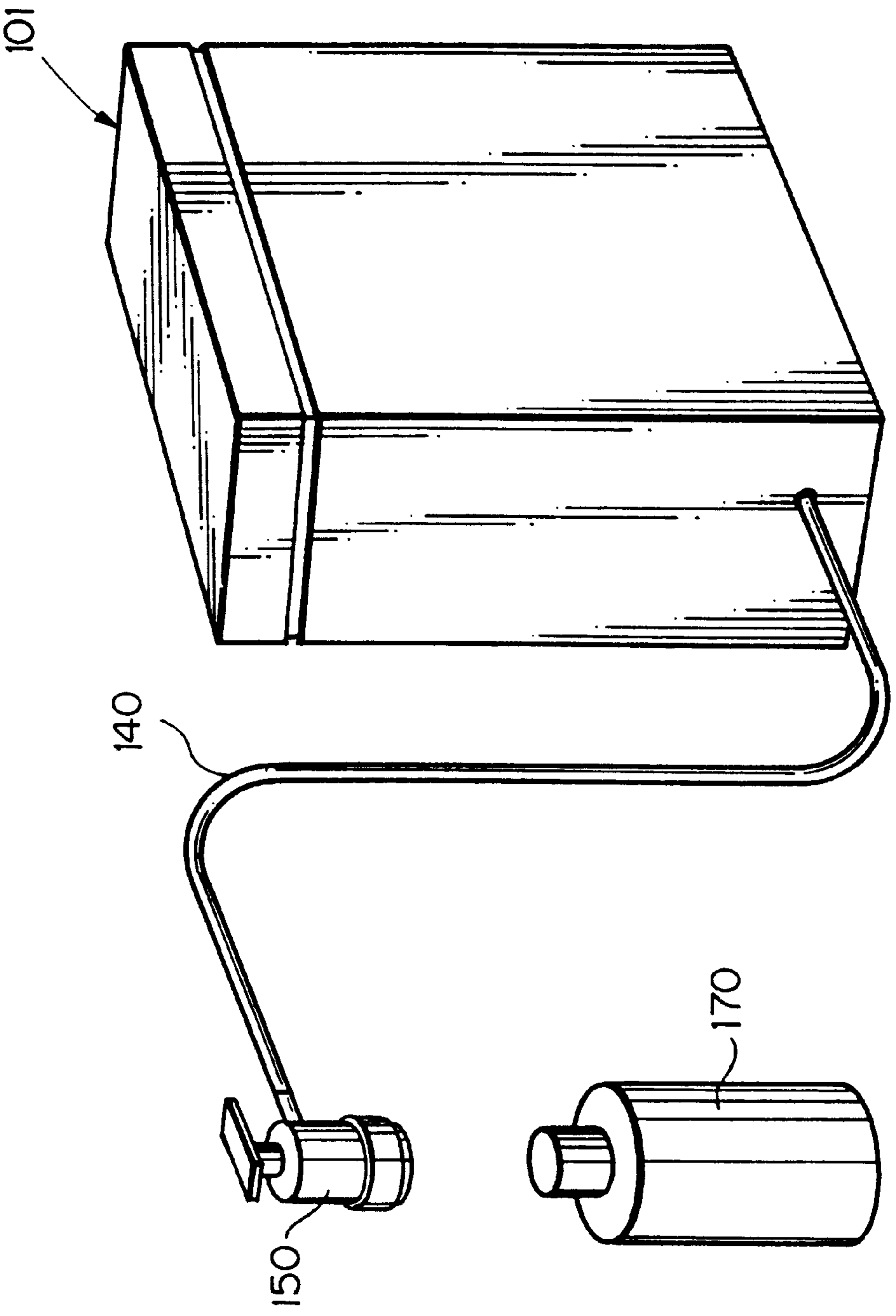
FIG. 6 is an external perspective view showing a specific configuration of a toner filling system in accordance with the illustrative embodiment.

FIG. 6 shows a specific toner filling system. As shown, the toner filling system is made up of a toner bottle 170, a toner storing and feeding unit 101, a hose or transfer member 140, and an attachment 150 fitted on the end of the hose 140.

Figure 7:
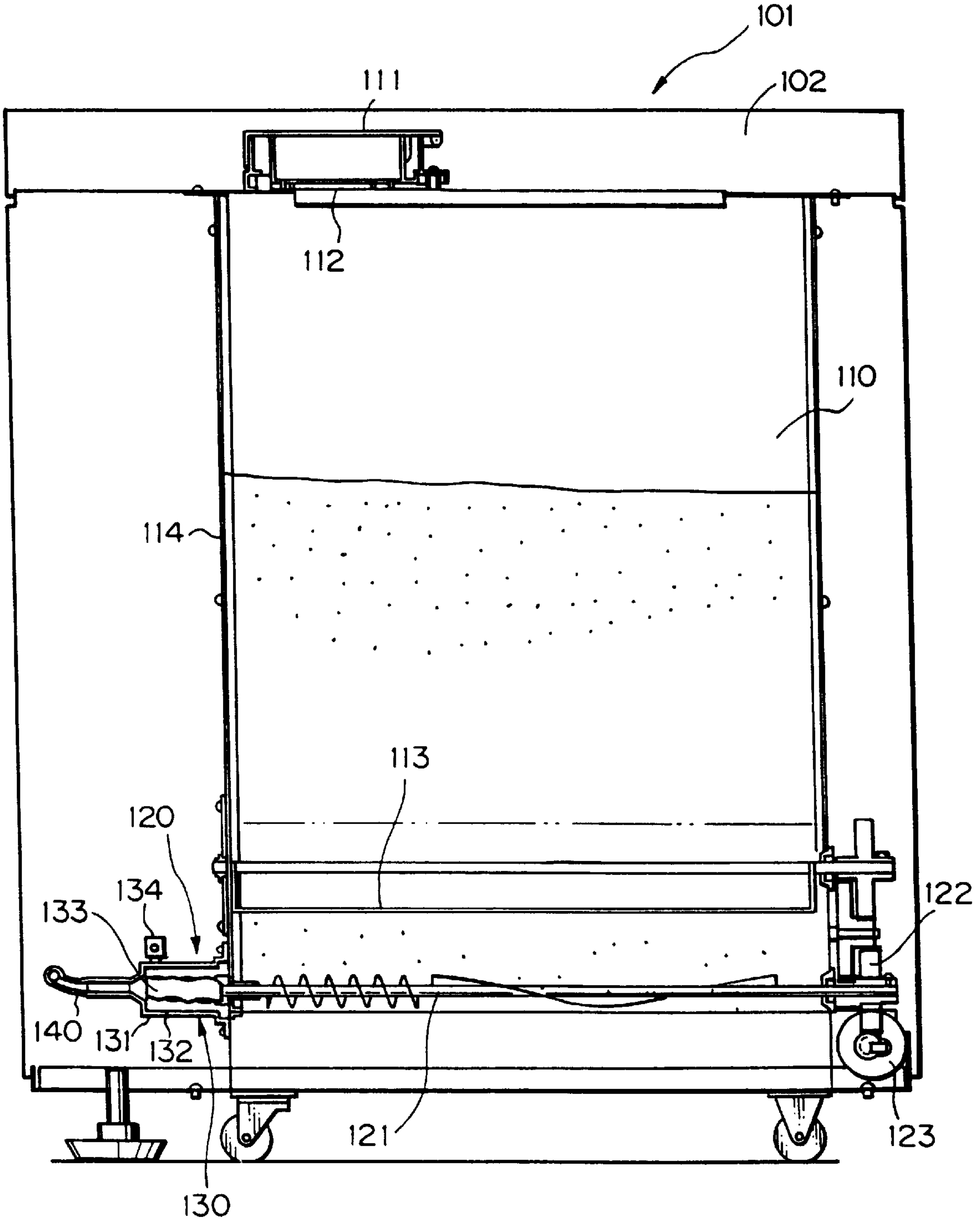
FIGS. 7 and 8 are sections showing the internal arrangement of the toner filling system.
Figure 8:
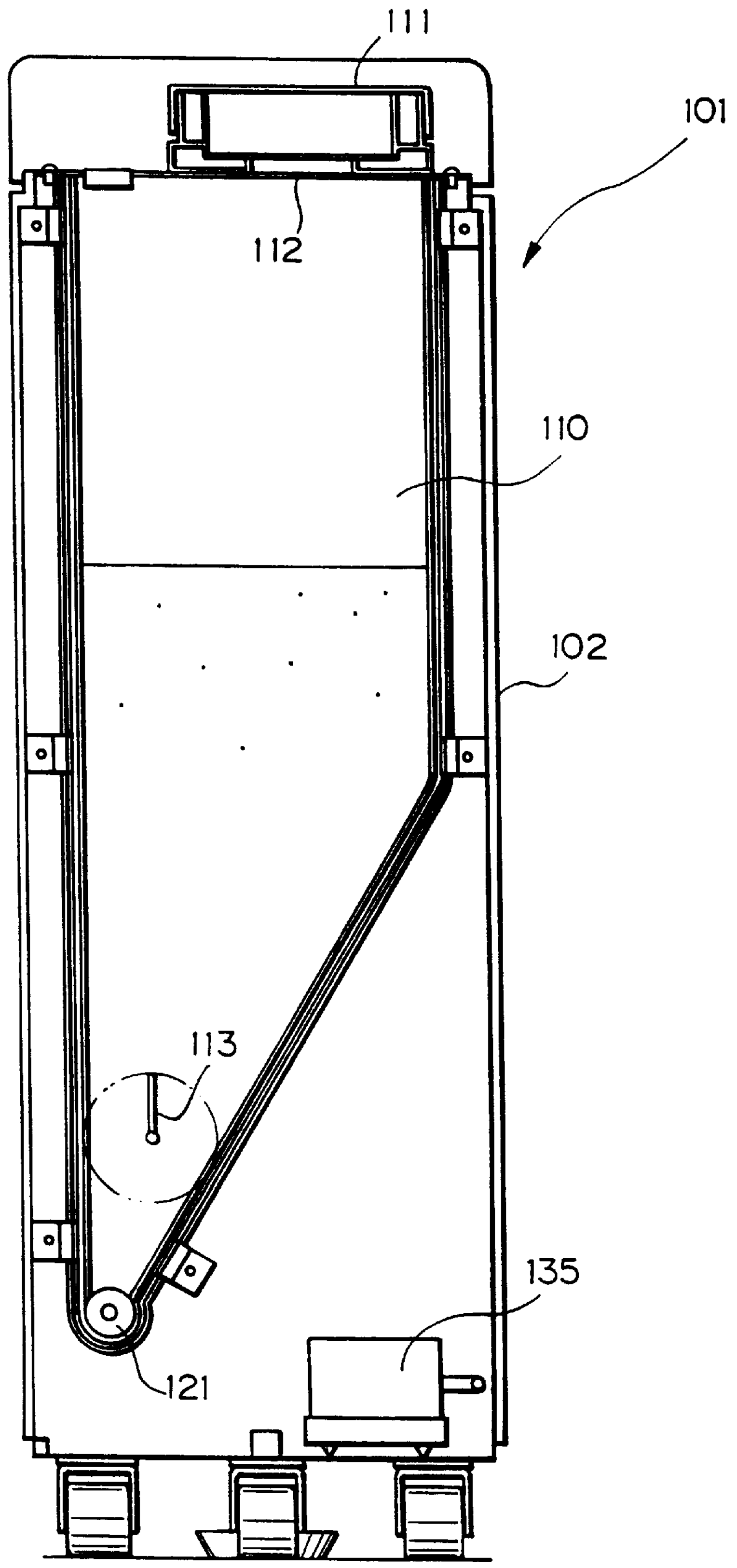

As shown in FIGS. 7 and 8, the toner storing and feeding unit 101 includes a vertically long box-like casing 102. Arranged in the casing 102 are a toner tank 110 storing toner and a powder pump unit 120. The powder pump unit or toner feeding means 120 feeds the toner stored in the toner tank 110 to the toner bottle 170, FIG. 6. A toner feed opening 112 is formed in the top of the toner tank 110 and is closed by a cap 111. The powder pump unit 120 is mounted on the bottom of the toner tank 110 inside of the tank 110. An agitator 113 is disposed above and in parallel to the powder pump unit 120 in order to agitate the toner stored in the toner tank 110. The agitator 113 therefore prevents the toner from cohering and blocking.

The powder pump unit 120 includes a conveyor screw 121 and a screw pump 130 contiguous with the conveyor screw 121. The screw pump unit 130 is made up of a female screw type stator 132 formed of rubber or similar elastic material and a male screw type rotor 133 rotatably received in the stator 132. The stator 132 is supported by a holder 131 affixed to the casing 114 of the toner tank 110 and is formed with a double pitch, spiral groove. The rotor 133 is connected to one end of the shaft of the conveyor screw 121 by a screw or a pin. The other end of the conveyor screw 121 extends throughout the casing 114 and is driven by a drive motor 123 via a gear train 122 outside of the casing 114.

The inner periphery of the holder 131 and the outer periphery of the stator 132 are spaced by a gap as small as about 1 mm. This gap is communicated to the discharge side of the pump 130. An air inlet 134 is formed in the holder 131 and communicated to the above gap. The air inlet 134 is communicated to an air pump 135 by a tubing not shown. The air pump 135 feeds compressed air to the air inlet 134 at a rate of 0.5 to 2.0 litters per minute. The compressed air promotes the fluidization of the toner and thereby insures the conveyance effected by the screw pump 130.

The hose 140 is connected to the discharge side of the screw pump 130 and should preferably be implemented by a tube formed of a material which is flexible and resistive to toner, e.g., soft vinyl chloride, silicone, nylon or Teflon (trade name).

The screw pump or so-called Mono pump 130 is capable of conveying a constant amount of toner continuously with a high solid-to-gas ratio and capable of conveying it accurately by an amount proportional to the rotation speed of the rotor 133. Therefore, the amount of toner to be conveyed can be controlled in terms of the duration of drive of the screw pump 130. The hose 140 is capable of transferring the toner in any desired direction, i.e., upward, downward, rightward or leftward. Further, the screw pump 130 allows a minimum of toner to cohere and a minimum of air to flow reversely if the previously stated conditions of $0.94 \leqq RA/S.MIN \leqq 1.04$ and $0.99 \leqq RB \times 2/(S.MIN+S.MAX) \leqq 1.08$ are satisfied.

Figure 9A:
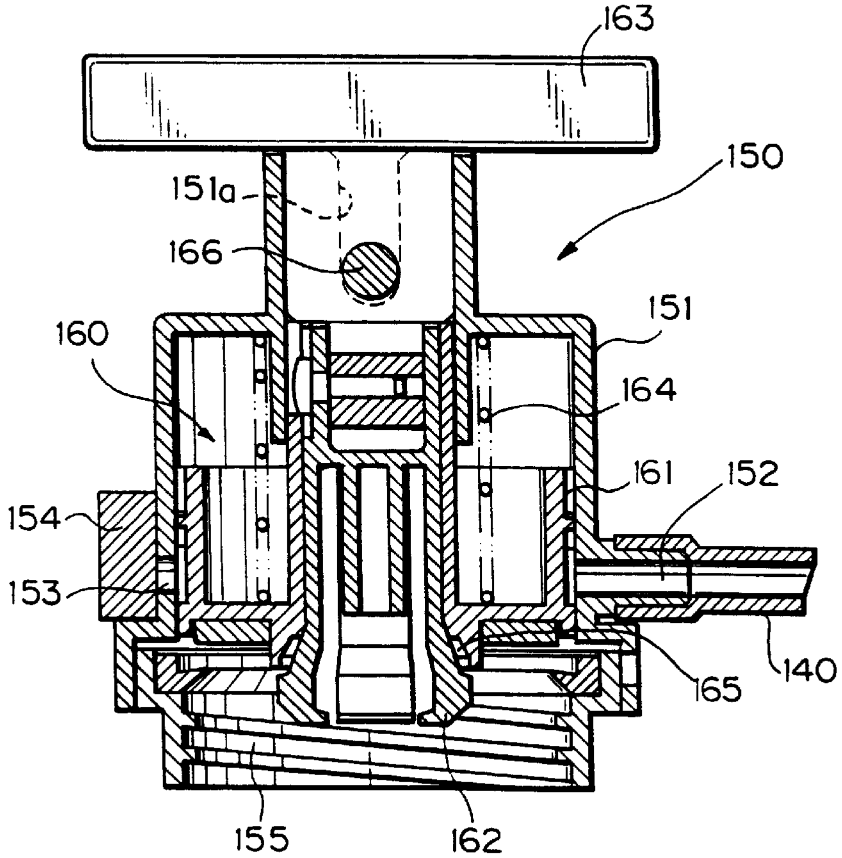
FIGS. 9A and 9B are sections showing a specific configuration of an attachment included in the illustrative embodiment.
Figure 9B:
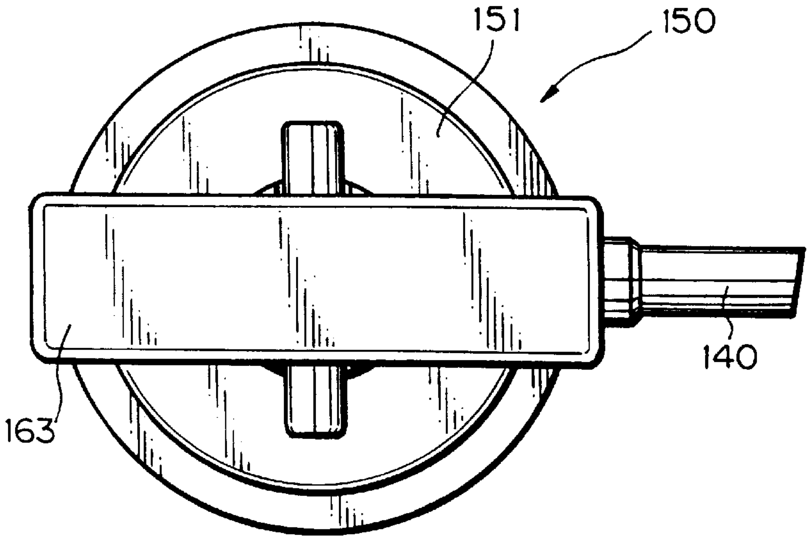

As shown in FIGS. 9A and 9B, the attachment 150 fitted on the end of the hose 140 includes a hollow cylindrical holder 151. The holder 151 has thereinside a capping and uncapping device 160, a toner inlet 152 to which the hose 140 is connected, a vent 153 substantially opposite in position to the toner inlet 152 and covered with a filter 154, and a female screw or engaging means 155 capable of mating with the toner bottle 170.

The capping and uncapping device 160 includes a slider or opening and closing member 161 slidably received in the holder 151. A chuck or removing means 162 is received in the slider 161 for chucking a lug formed on a cap fitted on the toner bottle 170, as will be described specifically later. A knob 163 is affixed to the chuck 162. A compression spring 164 constantly biases the slider 161 to the side opposite to the side where the knob 163 is positioned. The slider 161 is supported by the holder 151 and biased by the spring 164 to be movable between a position where it closes the toner inlet 152 and a position where it opens the toner inlet 152 (see FIG. 7). A lock pin or retaining means 166 is studded on the knob 163 and received in vertical guide slots 151*a* formed in the holder 151 from one end of the holder 151. Also shown in FIG. 9A is a tapered portion 165 which will be described later.

Figure 10:
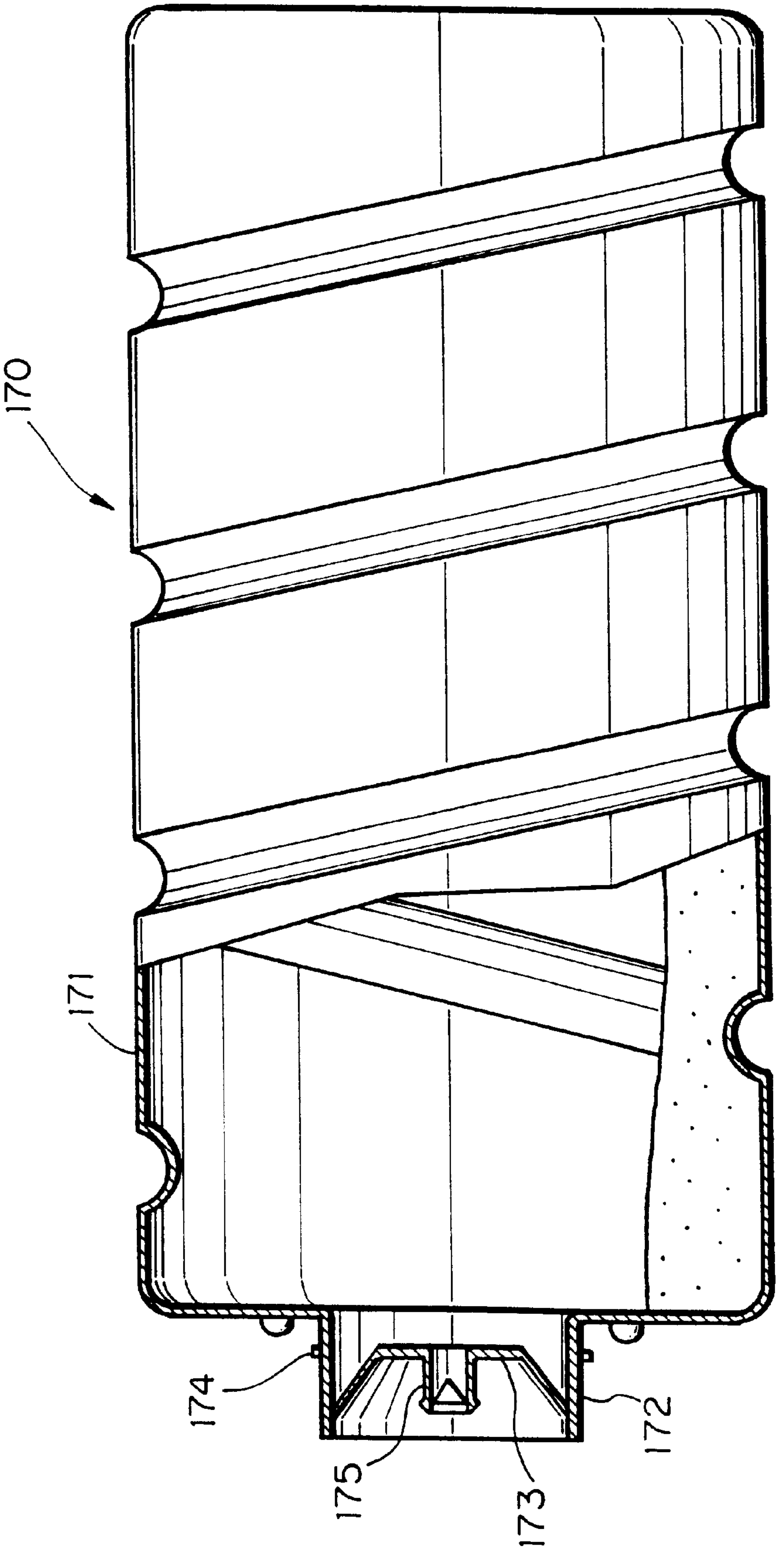
FIG. 10 is a partly cut away section showing a toner bottle applicable to the illustrative embodiment.

As shown in FIG. 10, the toner bottle 170 has a hollow cylindrical body 171 and a mouth portion 172 positioned at one end of the body 171. The mouth portion 172 is usually closed by a cap 173. A male screw 174 is formed on the outer periphery of the mouth portion 172 and capable of mating with the female screw 155. The cap 173 is fitted in the mouth portion 172 by being pushed into the portion 172. The previously mentioned lug, labeled 175, extends out from the outer surface of the cap 173.

Figure 11:
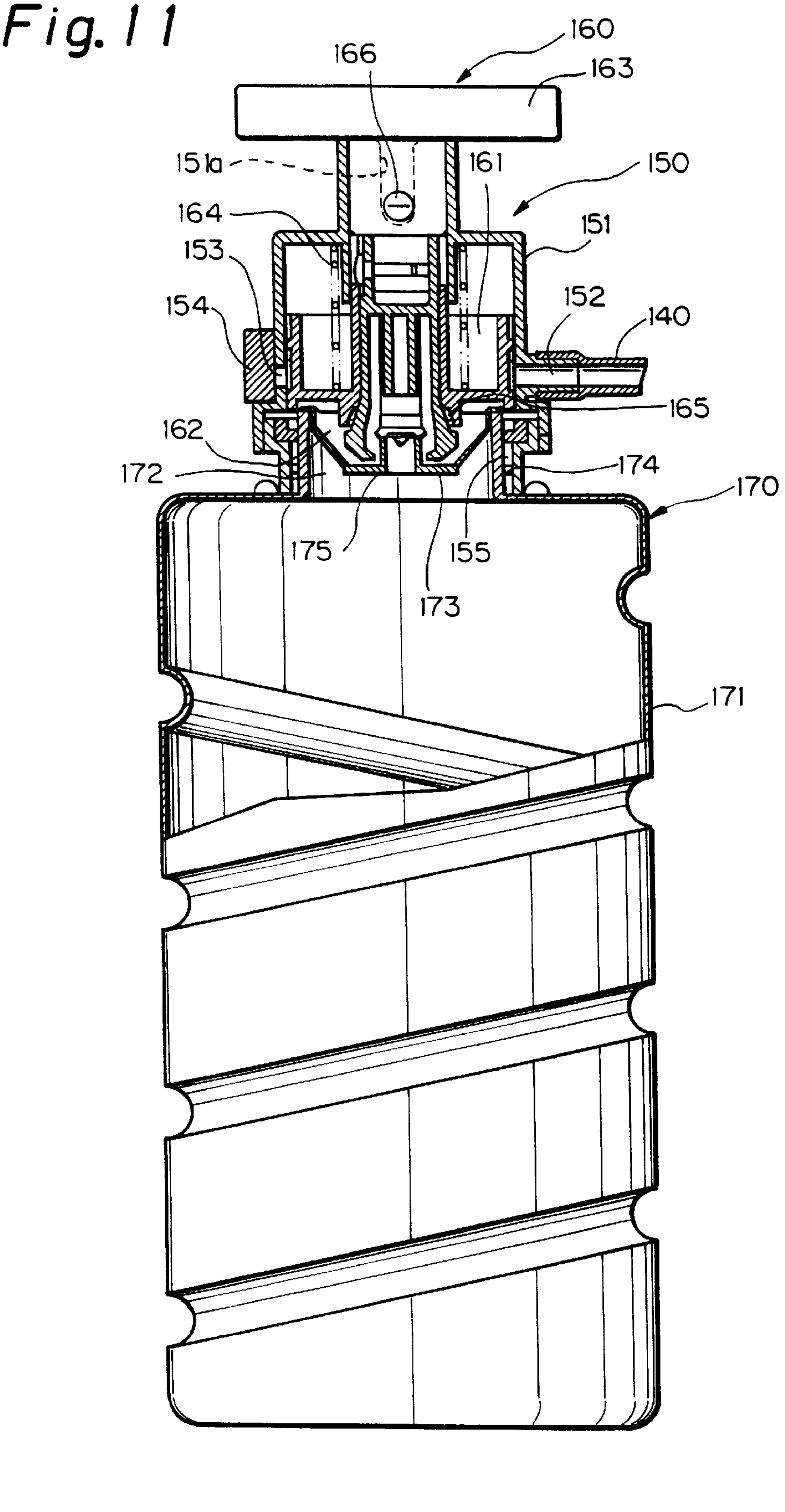
FIG. 11 is a section showing the attachment of FIGS. 9A and 9B and toner bottle of FIG. 10 engaged with each other.

How the attachment 150 is mounted to the toner bottle 170 will be described with reference to FIGS. 11 and 12. First, as shown in FIG. 11, the female screw 155 of the holder 151 and the male screw 174 of the toner bottle 170 are caused to mate with each other. Then, the knob 163 is pulled away from the toner bottle 170. As a result, the slider 161 is caused to move via the chuck 162 affixed integrally with the knob 163. At the same time, the slider 164 is pressed by the compression spring 164 in the direction opposite to the direction in which the knob 163 is pulled, and is closed thereby. Specifically, the tapered portion 165 mentioned earlier is formed on the outer periphery of the end portion of the chuck 162. The tapered portion 165 contacts and slide on the inner end of the slider 161, causing the chuck 162 to close. At this instant, the chuck 162 chucks the lug 175 of the cap 173 closing the toner bottle 170.

Figure 12:
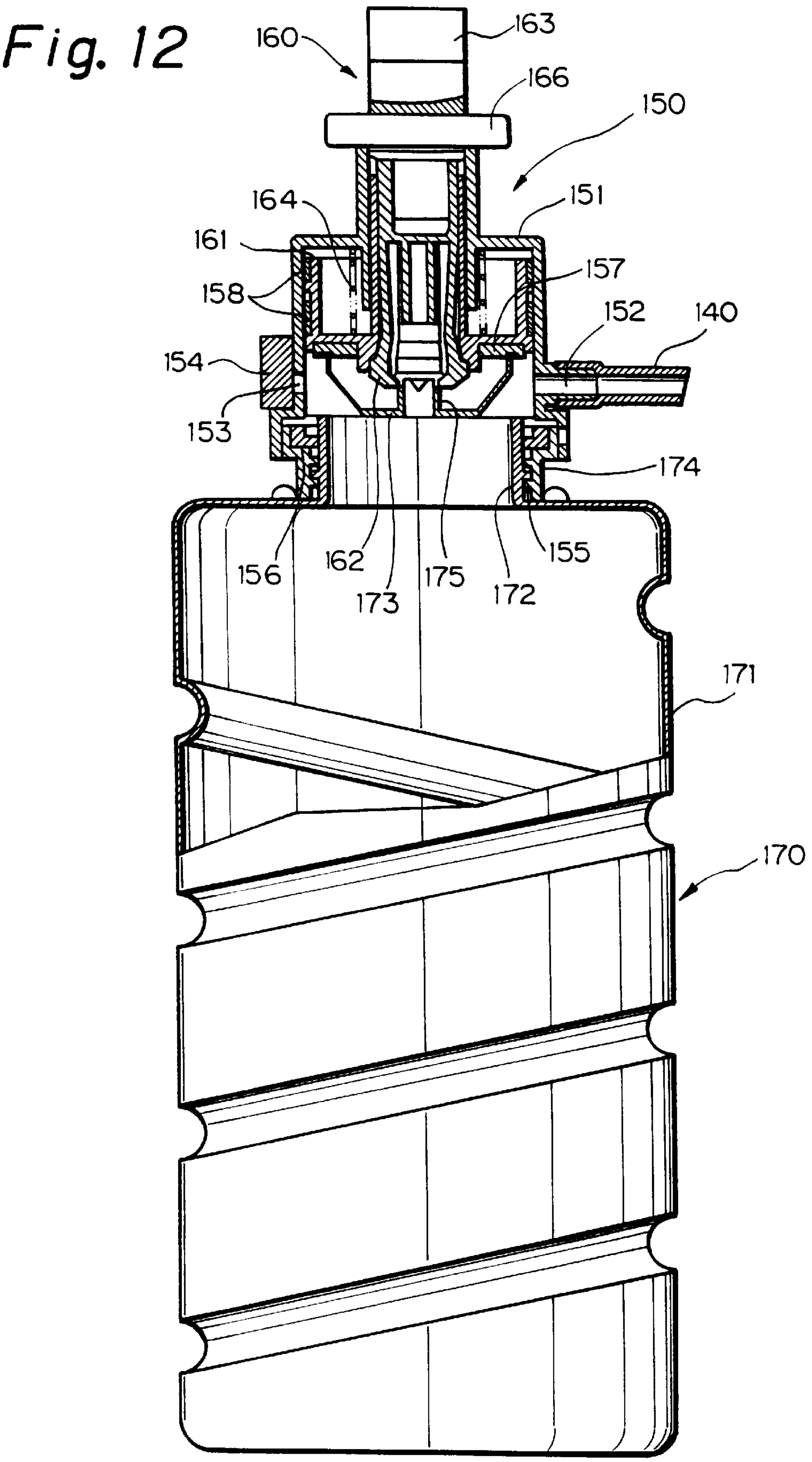
FIG. 12 is a section showing the attachment and toner bottle in a toner filling condition.

Subsequently, as shown in FIG. 12, the knob 163 pulled away from the toner bottle 170 is turned by substantially 90 degrees. As a result, the lock pin 166 studded on the knob 163 is released from the guide slots 151*a* of the holder 151 and then supported by the edge of the holder 151. The cap 173 is therefore moved by the chuck 162 to a position where it is removed from the body 171 of the toner bottle 170 and opens the mouth portion 172 of the bottle 170.

When the cap 173 is removed from the toner bottle 170, as stated above, the slider 161 and cap 173 are positioned above the toner inlet 152 and vent 153 formed in the holder 151. Therefore, the toner inlet 152 and vent 153 are held in communication with the mouth portion 172 of the toner bottle 170. In this condition, the drive motor 123 and air pump 135 are driven in order to cause the screw pump 130 to convey the toner stored in the toner tank 110. As a result, the toner is fed into the toner bottle 170 via the hose 140. Air conveyed together with the toner and air inside the toner bottle 170 are discharged to the outside via the vent 153 and filter 154. The discharge of air allows the toner to be efficiently filled in the toner container 170.

The attachment 150 additionally includes various rubber seal members in order to prevent the toner from flying about. Specifically, a seal 156 is fitted on the inner periphery of the holder 151 in order to seal the mouth portion 172 of the toner bottle 170. A seal 157 is fitted on the end of the slider 161 in order to seal the cap 153 and slider 161. Further, a seal 158 is fitted on the outer periphery of the slider 161 in order to seal the holder 151 and slider 161. With the seal members 156, 157 and 158, it is possible to prevent to the toner from being scattered to the outside during filling operation.

After the toner bottle 170 has been filled with the toner, the above procedure is effected in the reverse order. Specifically, when the knob 163 is turned by 90 degrees in the reverse direction, the lock pin 166 is again aligned with the guide slots 151 a with the result that the slider 161, knob 163 and chuck 162 are moved downward by the compression spring 164. Consequently, the cap 173 is again fitted in the mouth portion 172 of the toner bottle 170. Subsequently, the toner bottle 170 or the holder 151 is rotated until the bottle 170 and holder 151 have been released from each other.

Because the attachment 150 released from the toner bottle 170 has its toner inlet 152 blocked by the seal 158 and because the bottle 170 is closed by the cap 173, the toner is prevented from flying out of the attachment 150 or the bottle 170.

Figure 13:
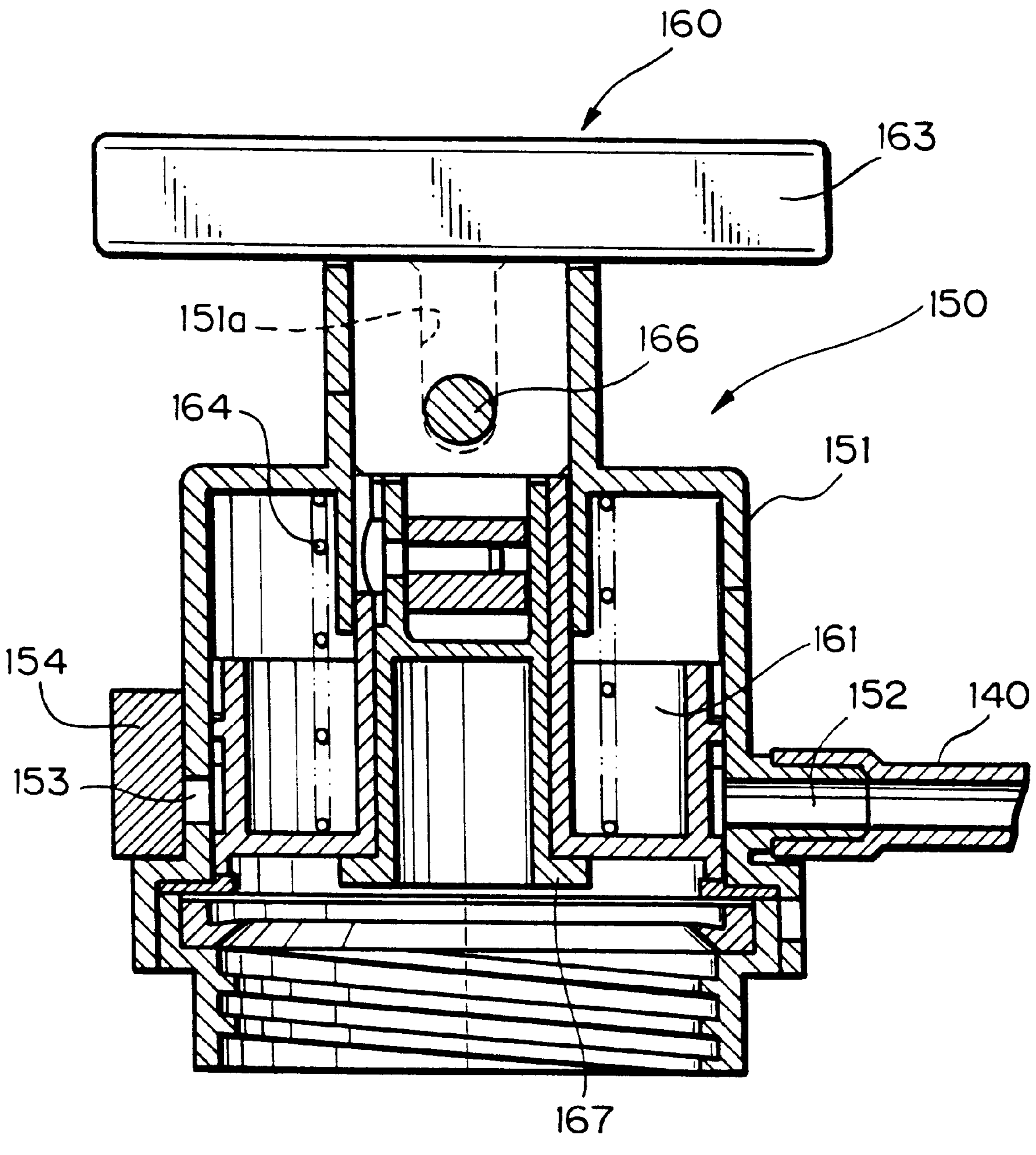
FIG. 13 is a section showing another specific configuration of the attachment.

FIG. 13 shows another specific configuration of the attachment 150 which is applicable to a toner bottle lacking a cap. In FIG. 13, structural elements identical with the structural elements shown in FIGS. 11 and 12 are designated by identical reference numerals. As shown, the slider 150 includes opening and closing means implemented by the slider 161 and compression spring 164. A locking portion 167 formed on the bottom of the nob 163 is engaged with the slider 161.

In the configuration shown in FIG. 13, after the attachment 150 has been engaged with the toner bottle 170, the knob 163 is pulled away from the bottle 170. As a result, the slider 161 engaged with the locking portion 167 is lifted against the action of the compression spring 164, unblocking the toner inlet 152. Thereafter, the knob 163 is turned until it has been held by the lock pin 166 at the position where the toner inlet 152 is opened. In this condition, the toner is filled in the toner bottle 170.

In this manner, if a plurality of attachments 150 each matching with a particular kind of toner bottle are prepared and replaced with each other, the toner can be filled in any kind of toner bottle. In addition, the attachment 150 can be replaced only if the hose 140 is removed from the toner inlet 152.

Generally, toner is filled in the toner bottle 170 up to 70% to 80% of the volume of the bottle 170. It is therefore preferable to control the amount of toner to be fed into the toner bottle 170. While some different methods are available for the control over the amount of toner, one preferable method is to control it in terms of weight. Specifically, the weight of the toner bottle 170 may be measured before and after the filling operation, in which case the motor and air pump will be caused to stop operating when the bottle 170 reaches a preselected weight. Alternatively, a sensor responsive to the amount of toner being conveyed may be disposed in the toner storing and feeding device 101 or on a conveyance path.

In any case, for reliable toner conveyance, the drive of the powder pump unit 120 and the timing for feeding air are important. It is more preferable that the feed of air begins before the drive of the screw pump 130 and ends in a preselected period of time after the stop of the screw pump 130. This successfully prevents the toner from being left in the hose 140 and thereby promotes the stable filling of the toner.

Because the vent 153 is formed in the attachment 150, the toner bottle 170 does not need any vent and can be provided with a configuration which is simple and feasible for recycling. This is desirable from the cost standpoint.

Toner for use in an electrophotographic image forming apparatus lacks in fluidity and cannot be easily conveyed, as well known in the art. During conveyance, such toner should be free from heavy mechanical stresses. Any excessive stress would bring about blocking, crushing and so forth of toner and would thereby vary the characteristic of toner and obstruct conveyance. Moreover, such a stress would damage various toner conveying members including a coil, a screw and a piping as well as a drive member.

In the conventional toner conveying device relying on a screw and a piping, as stated earlier, the mechanical stress ascribable to the screw and the mechanical stress ascribable to friction between the screw and the piping are extremely heavy. These stresses are more aggravated as the distance of conveyance increases and as the direction of conveyance changes. Further, the stresses noticeably increase the torque necessary for driving the screw and therefore the cost of the drive member and power consumption.

For the above reasons, it has been customary to connect a plurality of screws and a plurality of pipings in order to extend the conveyance path or to change the direction of conveyance. This further changes the characteristic of toner, increases the number of parts and therefor cost, deteriorates reliability, maintenance, and productivity, increases the space to be occupied by the toner conveying device, and obstructs easy operation.

In the illustrative embodiment, the toner filling system is practicable only if a flexible toner conveying member is connected to toner feeding means. This, coupled with the fact that toner is conveyed along the toner conveying means in the form of a toner and air mixture, causes a minimum of mechanical stress to act on the toner and frees the conveying member from a drive load. Consequently, the system preserves the characteristic of toner and insures the conveyance of toner while enhancing the reliability and durability of the toner filling device. In addition, the system simplifies the configuration of the toner filling device and reduces the drive load, thereby saving power and cost.

In the above toner filling system, the toner storing and feeding unit 101 is assumed to be stationary and to include a toner storing portion having a relatively large capacity. Although such a unit 101 lacks in portability, it can refill empty toner bottles collected from users if situated at a strongpoint for toner distribution, i.e., an intermediate position between a production position, including sales and services, and users' stations. The system therefore promotes the repeated use of toner bottles in order to save limited resources and makes it needless to convey emptied toner bottles. Consequently, there can be promoted easy operation by a serviceman, efficient toner filling, productivity at a factory, and service maintenance. If desired, the system can be situated at users' stations and operated by users themselves.

Of course, the toner filling system can be readily implemented as a small size, portable system including a toner storing and feeding unit of medium or small capacity. The system with portability achieves remarkable advantages, as follows. A serviceman, for example, can carry the system to a user's station and directly refill an empty toner bottle there. Further, a serviceman can refill not only a toner bottle but also an image forming apparatus itself, e.g., a toner hopper included in a copier or similar image forming apparatus. This not only eliminates the need for a toner bottle, but also allows toner to be replenished in an amount matching with the amount of consumed toner. In addition, the among of toner replenishment can be limited in accordance with, e.g., the user s request. It is to be noted that the system allows toner to be replenished even to a toner bank or similar tank for feeding toner to the toner hopper.

The system, whether it be stationary or portable, makes it needless to transport used toner bottles from the user's stations to a factory because the bottles can be refilled at the intermediate distribution position. This shortens a developer distribution path, enhances efficient collection of toner bottles 170, and reduces the collection cost.

Furthermore, the system can cope with users' urgent requests immediately. If the system is portable, then it frees users from the replenishment of a developer and the replacement of the toner bottle 170 which are troublesome and awkward, while making it needless for users to store or discard used toner bottles 170. Particularly, users needing a medium or a great amount of copies or printings usually make a maintenance contract with a manufacturer or a maintenance company in order to secure periodic inspection and maintenance. If a serviceman visited such a user for periodic maintenance finds that the amount of developer left in the image forming apparatus is short, then portable system allows the serviceman to replenish the developer and thereby obviates a system down ascribable to the end of toner. This, of course, makes the distribution path shortest and thereby enhances efficient collection of toner bottles 170 while noticeably reducing the collection cost.

In summary, in accordance with the present invention, a screw pump is capable of desirably conveying powder over a long period of time because a rotor and a stator thereof can bite into each other by an amount matching with the rotation speed of the rotor. Particularly, the screw pump causes a minimum of toner to cohere and a minimum of air to flow reversely when used to convey the toner, so that the service life of the pump is extended. Further, the path and cost for the distribution of a developer can be reduced while a container for storing the developer can be recycled, freeing users from troublesome replacement of the developer.

Various modifications will become possible for those skilled in the art after receiving the teachings of the present disclosure without departing from the scope thereof. For example, while the illustrative embodiment has concentrated on toner, the present invention is similarly practicable with a developer implemented as a toner and carrier mixture. Collected toner which is returned to a developing unit in the above embodiment may be collected in a waste developer tank or may even be returned to a developing unit via an intermediate developer bank. While the illustrative embodiment conveys a developer collected by a photoconductive element cleaning unit and a transfer cleaning unit together, it may convey only one of them. Particularly, the developer collected by the transfer cleaning unit and containing paper dust and other impurities may advantageously be returned to a waste developer tank without being recycled.

What is claimed is:

1. A screw pump comprising:

a female screw type stator formed with a double pitch spiral groove in an inner periphery thereof; and a male screw type rotor rotatably received in said stator;

wherein said rotor has a sectional diameter of RA, and that said stator has a minimum inside diameter of S.MIN, said rotor and said stator bite into each other such that a dimensional ratio of RA/S.MIN satisfies a relation:

$$RA/S.MIN \leqq 1.04.$$

2. A screw pump comprising:

a female screw type stator formed with a double pitch spiral groove in an inner periphery thereof; and a male screw type rotor rotatably received in said stator;

wherein said rotor has a sectional diameter of RA, and that said stator has a minimum inside diameter of S.MIN, said rotor and said stator bite into each other such that a dimensional ratio of RA/S.MIN satisfies a relation:

$$0.94 \leqq RA/S.MIN.$$

3. A screw pump comprising:

a female screw type stator formed with a double pitch spiral groove in an inner periphery thereof; and a male screw type rotor rotatably received in said stator;

wherein said rotor has an outside diameter of RB, and that said stator has a minimum inside diameter of S.MIN and a maximum inside diameter of S.MAX, said rotor and said stator bite into each other such that a dimensional ratio of RB×2/(S.MIN+S.MAX) satisfies a relation:

$$0.99 \leqq RB \times 2/(S.MIN+S.MAX).$$

4. A screw pump comprising:

a female screw type stator formed with a double pitch spiral groove in an inner periphery thereof; and a male screw type rotor rotatably received in said stator;

wherein said rotor has an outside diameter of RB, and that said stator has a minimum inside diameter of S.MIN and a maximum inside diameter of S.MAX, said rotor and said stator bite into each other such that a dimensional ratio of RB×2/(S.MIN+S.MAX) satisfies a relation:

$$RB \times 2/(S.MIN+S.MAX) \leqq 1.08.$$

5. A screw pump comprising:

a female screw type stator formed with a double pitch spiral groove in an inner periphery thereof; and a male screw type rotor rotatably received in said stator;

wherein said rotor has a sectional diameter of RA and an outside diameter of RB, and that said stator has a minimum inside diameter of S.MIN and a maximum inside diameter of S.MAX, said rotor and said stator bite into each other such that a dimensional ratio of RA/S.MIN satisfies a relation:

$$RA/S.MIN \leqq 1.04$$

and such that a dimensional ratio of RB×2/(S.MIN+S.MAX) satisfies a relation:

$$0.99 \leqq RB \times 2/(S.MIN+S.MAX).$$

6. A toner conveying device comprising:

a screw pump comprising a female screw type stator formed with a double pitch spiral groove in an inner periphery thereof, and a male screw type rotor rotatably received in said stator, for conveying powdery toner; and air feeding means for feeding air under pressure to a toner outlet of said screw pump when said screw pump is in operation;

wherein said rotor has a sectional diameter of RA, and that said stator has a minimum inside diameter of S.MIN, said rotor and said stator bite into each other such that a dimensional ratio of RA/S.MIN satisfies a relation:

$$0.94 \leqq RA/S.MIN \leqq 1.04.$$

7. A device as claimed in claim 6, wherein the dimensional ratio of RA/S.MIN is set in proportion to a rotation speed of said rotor.

8. A toner conveying device comprising:

a screw pump comprising a female screw type stator formed with a double pitch spiral groove in an inner periphery thereof, and a male screw type rotor rotatably received in said stator, for conveying powdery toner; and air feeding means for feeding air under pressure to a toner outlet of said screw pump when said screw pump is in operation;

wherein said rotor has an outside diameter of RB, and that said stator has a minimum inside diameter of S.MIN and a maximum inside diameter of S.MAX, said rotor and said stator bite into each other such that a dimensional ratio of RB×2/(S.MIN+S.MAX) satisfies a relation:

$$0.99 \leqq RB \times 2/(S.MIN+S.MAX) \leqq 1.08.$$

9. A device as claimed in claim 8, wherein the dimensional ratio of RB×2/(S.MIN+S.MAX) is set in proportion to a rotation speed of said rotor.

10. A toner conveying device comprising:

a screw pump comprising a female screw type stator formed with a double pitch spiral groove in an inner periphery thereof, and a male screw type rotor rotatably received in said stator, for conveying powdery toner; and air feeding means for feeding air under pressure to a toner outlet of said screw pump when said screw pump is in operation;

wherein said rotor has a sectional diameter of RA and an outside diameter of RB, and that said stator has a minimum inside diameter of S.MIN and a maximum inside diameter of S.MAX, said rotor and said stator bite into each other such that a dimensional ratio of RA/S.MIN satisfies a relation:

$$0.94 \leqq RA/S.MIN \leqq 1.04$$

and such that a dimensional ration of RB×2/(S.MIN+S.MAX) satisfies a relation:

$$0.99 \leq RB \times 2/(S.MIN + S.MAX) \leq 1.08.$$

11. A system for filling toner in a toner storing section for replenishing toner to a developing unit included in an image forming apparatus, said system comprising:

a toner storing and feeding unit including toner storing means for storing toner to be filled in a filling portion included in the toner storing section, and toner feeding means including a toner conveying device for feeding the toner stored in said toner storing means;

a connecting device to be removably connected to said toner storing section said connecting device comprising an engaging device configured to removably engage with said filling portion of said toner section; and a flexible conveying member providing communication between said connecting device and said toner storing and feeding unit;

wherein the toner stored in said toner storing means is conveyed to said toner storing section by said toner conveying device.

12. A system as claimed in claim 11, wherein said toner conveying device comprises:

a screw pump comprising a female screw type stator formed with a double pitch spiral groove in an inner periphery thereof, and a male screw type rotor rotatably received in said stator, for conveying powdery toner; and air feeding means for feeding air under pressure to a toner outlet of said screw pump when said screw pump is in operation;

wherein said rotor has a sectional diameter of RA and an outside diameter of RB, and that said stator has a minimum inside diameter of S.MIN, said rotor and said stator bite into each other such that a dimensional ratio of RA/S.MIN satisfies a relation:

$$0.94 \leq RA/S.MIN \leq 1.04.$$

13. A system as claimed in claim 11, wherein said toner conveying device comprises:

a screw pump comprising a female screw type stator formed with a double pitch spiral groove in an inner periphery thereof, and a male screw type rotor rotatably received in said stator, for conveying powdery toner; and air feeding means for feeding air under pressure to a toner outlet of said screw pump when said screw pump is in operation;

wherein said rotor has an outside diameter of RB, and that said stator has a minimum inside diameter of S.MIN and a maximum inside diameter of S.MAX, said rotor and said stator bite into each other such that a dimensional ratio of RB×2/(S.MIN+S.MAX) satisfies a relation:

$$0.99 \leq RB \times 2/(S.MIN + S.MAX) \leq 1.08.$$

14. A system as claimed in claim 11, wherein said toner conveying device comprises:

a screw pump comprising a female screw type stator formed with a double pitch spiral groove in an inner periphery thereof, and a male screw type rotor rotatably received in said stator, for conveying powdery toner; and air feeding means for feeding air under pressure to a toner outlet of said screw pump when said screw pump is in operation;

wherein said rotor has a sectional diameter of RA and an outside diameter of RB, and that said stator has a minimum inside diameter of S.MIN and a maximum inside diameter of S.MAX, said rotor and said stator bite into each other such that a dimensional ratio of RA/S.MIN satisfies a relation:

$$0.94 \leq RA/S.MIN \leq 1.04$$

and such that a dimensional ratio of RB×2/(S.MIN+S.MAX) satisfies a relation:

$$0.99 \leq RB \times 2/(S.MIN + S.MAX) \leq 1.08.$$

15. A system as claimed in claim 11, wherein said connecting device comprises a vent for venting air.

16. A system as claimed in claim 15, wherein said filling portion of said toner storing section is closed by a cap, said connecting device comprising a removing means for removing said cap, and holding means for holding said cap removed from said filling portion at a removed position.

17. A system as claimed in claim 16, further comprising a toner inlet intervening between said filling portion and said cap held at said removed position.

18. A system as claimed in claim 16, wherein said vent is positioned between said filling portion and said cap held at said removed position.

19. A system as claimed in claim 11, wherein said connecting device comprises a toner inlet to which said conveying member is connected, and opening and closing means for opening and closing said toner inlet.

20. A system as claimed in claim 19, wherein said opening and closing means comprises an opening and closing member movable between a position for opening said toner inlet and a position for closing said toner inlet, and a seal member fitted on a surface of said opening and closing member facing said toner inlet.

21. A system as claimed in claim 19, wherein said filling portion of said toner storing section is closed by a cap, said connecting device comprising a removing means for removing said cap, and holding means for holding said cap removed from said filling portion at a removed position.

22. A system as claimed in claim 21, wherein said toner inlet is positioned between said filling portion and said cap held at said removed position.

23. A system as claimed in claim 11, wherein the toner storing section comprises a bottle-like container removably mounted to the developing unit.

24. A system as claimed in claim 11, wherein the toner storing section comprises a toner replenishing section for replenishing toner to a developing section included in the developing unit.

* * * * *